United States Patent [19]

Treadway et al.

[11] 4,378,250

[45] Mar. 29, 1983

[54] ORGANOSILICONE COATING COMPOSITIONS

[76] Inventors: Gerald D. Treadway, 1802 Adobe Rd., Petaluma, Calif. 94952; Brian J. Carr, 114 Hickory Rd., Fairfax, Calif. 94930

[21] Appl. No.: 288,697

[22] Filed: Jul. 31, 1981

[51] Int. Cl.³ .................... C07G 17/00; C09K 3/00
[52] U.S. Cl. .................... 106/287.11; 106/287.12; 106/287.13; 428/411; 428/429; 528/38
[58] Field of Search ............ 556/413; 528/25, 38; 106/287.13, 287.11; 428/429, 411

[56] References Cited

U.S. PATENT DOCUMENTS

| 2,942,019 | 6/1960 | Pike et al. | 556/413 |
|---|---|---|---|
| 3,166,527 | 1/1965 | Ender | 260/32.2 |
| 3,291,775 | 12/1966 | Holm | 260/47 |
| 3,591,408 | 7/1971 | Marzocchi | 117/54 |
| 3,837,876 | 9/1974 | Mayuzumi et al. | 106/287 SB |
| 3,961,977 | 6/1976 | Koda et al. | 106/287 SB |
| 3,986,997 | 10/1976 | Clark | 428/412 |
| 4,027,073 | 5/1977 | Clark | 428/412 |
| 4,029,842 | 6/1977 | Yoshida et al. | 428/334 |
| 4,042,769 | 8/1977 | Lynch | 526/106 |
| 4,098,840 | 7/1978 | Yoshida et al. | 528/30 |
| 4,196,014 | 4/1980 | Taniyama et al. | 106/287.13 |
| 4,208,503 | 6/1980 | Martin | 528/14 |
| 4,241,116 | 12/1980 | Taniyama et al. | 427/386 |

*Primary Examiner*—Theodore Morris
*Attorney, Agent, or Firm*—Phillips, Moore, Lempio & Finley

[57] ABSTRACT

Coating compositions in accordance with the invention are usefully coated on substrates, such as plastic lenses, and cured. The cured coatings provide excellent abrasion resistance and good adherence and weathering properties. The coating compositions comprise an organic solvent and a mixture of at least two components derived by partial hydrolysis from precursor organosilicone compounds. The precursor compounds include a plurality of alkoxy groups, and the at least two components are partially hydrolyzed by greater than 40% of a stoichiometric amount of water required to hydrolyze the alkoxy groups. A first component of the two components is in an imine, aminal or enamine form, which extends working life of the coating compositions.

22 Claims, No Drawings

ORGANOSILICONE COATING COMPOSITIONS

BACKGROUND OF THE INVENTION

1. Field of the Invention

The present invention relates generally to coating compositions, and more particularly to polyorganosiloxane compositions forming mar resistant coatings on substrates.

2. Prior Art

A variety of substrates, including those made of glass, plastic, or metal and concrete, are usefully coated with protective films. It is generally desirable that protective coatings have good weathering, adhesion and resistance to thermal and mechanical shock, heat, humidity and common chemicals, and be practical to apply, dry and cure. These properties are more difficult to achieve on plastic substrates than many other substrates.

Some plastics are desirable substitutes for glass due to lighter weight, economically advantageous fabrications, and breakage resistance; but, commercially available plastic surfaces are less abrasion, mar, and scratch resistant than glass. Thus, protective coatings for plastic substrates are of particular interest.

Much effort has been done in this field, and several different technical approaches have been described. A majority of the work has been with polyorganosiloxanes crosslinked solely by condensation of silanol groups. This approach is typified in U.S. Pat. Nos. 3,986,997 and 4,027,073, assigned to Dow Corning. A further major area of development has been with fluoropolymer coatings.

Also, epoxy silanes cured with Lewis acids have been the subject of much research and development. Perhaps one of the more commercially successful approaches has been the use of epoxy silanes cured with metal esters, particularly titanates, exemplified by U.S. Pat. No. 4,042,769.

Among various types of coatings or primers known to the art are several epoxy and amino based polyorganosiloxanes. Six patents generally disclose an epoxyalkylalkoxysilane and/or an aminoalkylalkoxysilane for use in particular coating formulations. Thus, for example, U.S. Pat. No. 3,166,527, to H. H. Ender, issued Jan. 19, 1965, discloses finishing compositions for treating metal surfaces. U.S. Pat. No. 3,837,876, to T. Mayuzumi and Y. Inoue, issued Sept. 24, 1974, discloses polyorganosiloxane compositions useful in blends for sealant or primer coatings. U.S. Pat. No. 3,961,977, to H. Koda et al., issued June 8, 1976 discloses a coating composition for application to molded articles. U.S. Pat. No. 4,196,014, to S. Taniyama et al., issued Apr. 1, 1980, discloses a surface-treating paint for shaped plastic articles, and U.S. Pat. No. 4,241,116, to S. Taniyama et al., is an improvement on U.S. Pat. No. 4,196,014. Of these six, U.S. Pat. Nos. 3,961,977, 4,196,014, and 4,241,116 disclose that such silanes can be hydrolyzed with sufficient water to hydrolyze 10-40% of the available alkoxy groups.

However, the coatings or primers known to the art based upon epoxyalkylalkoxysilane and aminoalkylalkoxysilane have had several disadvantages. For example, stability of the coating solutions disclosed in U.S. Pat. No. 3,961,977 is achieved by high dilution, which is undesirable in that necessary (desirable) film thickness can only be achieved by the application of several coats. Also, compositions as taught by this patent are believed to be inferior in abrasion resistance and have been criticized in the literature as having poor resistance to weathering, to develop cracks, and/or to peel and humidity.

The present invention is directed to overcoming one or more of these problems.

SUMMARY OF THE INVENTION

Accordingly, it is an object of the present invention to provide compositions useful in coating transparent substrates, such as in optical application and particularly for coating plastics, which compositions react chemically to produce films which, when cured, have excellent mar and scratch resistance, good adhesion and resistance to thermal and mechanical shock, and which are resistant to weather, heat, humidity and common chemicals.

It is a further object of the present invention to provide compositions having suitable rheological and handling properties for coating of various substrates by flowing, dipping, spinning and/or spraying, brushing, roll coating, curtain coating and the like, and which have a sufficiently long working life for economical, large scale coating production without resort to complicated equipment.

In one aspect of the present invention, a coating composition comprises an organic solvent and a mixture of at least two components dissolved in the organic solvent. A first component of the at least two components is a nitrogen containing, partially hydrolyzed condensate derived from an aminoalkylalkoxysilane precursor. The first component includes imines, aminals, enamines, mixtures of these, and polymers thereof. A second component of the two components is an epoxy containing, partially hydrolyzed compound derived by partial hydrolysis from an epoxyalkylalkoxysilane precursor. Both precursors have a plurality of alkoxy groups, and the first and second components are partially hydrolyzed by greater than 40% of a stoichiometric amount of water required to hydrolyze the alkoxy groups.

The prior art discloses coating polymers from reaction of hydrosylates of epoxyalkylalkoxysilanes and aminoalkylalkoxysilanes, but such systems react and gel in a few minutes, even at ambient temperatures, when water in an amount greater than that needed to hydrolyze more than 40% of the available alkoxy groups is used. This has presented extreme difficulty in handling and application. The rate of reaction of these systems appears to be proportional to the degree to prehydrolysis or cohydrolysis of the alkoxy groups. To obtain even a minimal level of handleability, relatively low levels of water, generally less than 40% calculated stoichiometry based on the total content of hydrolysable alkoxy groups present, have been used. However, such relatively low levels of water, and hence hydrolysis, have provided inferior coatings.

By contrast, outstanding coating performance is obtained from compositions in accordance with the present invention. Despite the relatively high levels of hydrolysis (greater than 40% and more preferably 60%-80%) workability is maintained by use of the first component in the inventive coating compositions, which extends the composition's working life.

Compounds of the first component are preferably prepared as condensates between amino groups of the aminoalkylalkoxysilane precursors and carbonyl containing compounds. These condensates regenerate amino groups of partially hydrolyzed aminoalkylalkoxysilanes by decomposition, so as to permit reaction with the epoxy groups of the second component.

BEST MODE OF CARRYING OUT THE INVENTION

A coating composition in accordance with the present invention comprises an organic solvent and a mixture of at least two components, which mixture is dissolved in the organic solvent.

A wide variety of organic solvents are suitable for dissolving the mixture. The organic solvent may be a single compound or a blend of compounds. In either event, the suitable organic solvent maintains solubility of the mixture during hydrolysis and condensation thereof, is sufficiently low in viscosity to provide a range of solution viscosities by varying a ratio of the solvent with respect to the mixture, and is sufficiently volatile to evaporate before, or during, the cure conditions employed, once the coating composition has been coated upon the desired substrate.

Among various compounds suitable as the organic solvent are aliphatic or alicyclic alcohols, ketones, ethers, and esters. A particularly preferred solvent is methyl ethyl ketone with a small amount of acetone. As will be more fully described hereinafter, the organic solvent will normally include some methanol and/or ethanol generated from partial hydrolysis of precursor compounds.

The mixture of at least two components which is dissolved in the organic solvent will sometimes hereinafter be referred to as a non-volatile solids content of the coating composition. This non-volatile solids content is in a range of from about 10 wt. % to about 80 wt. % of the total coating composition, more preferably from about 20 wt. % to about 50 wt. % of the coating composition, and most preferably from about 20 wt. % to about 35 wt. % with respect to the total coating composition. The particular non-volatile solids concentration chosen will normally depend upon the method of coating to be employed (e.g. spraying, flowing, dipping, spinning, and the like).

A first component of the mixture's at least two components is a nitrogen containing, partially hydrolyzed condensate derived from an aminoalkylalkoxysilane precursor. A second component of the mixture's at least two components is an epoxy containing, partially hydrolyzed compound derived by partial hydrolysis from an epoxyalkylalkoxysilane precursor. Both of these precursors have a plurality of alkoxy groups. The first and second components are partially hydrolyzed by greater than 40%, and more preferably by about 60% to about 80%, of a stoichiometric amount of water required to hydrolyze the plurality of alkoxy groups of the precursors.

The aminoalkylalkoxysilane precursor and the epoxyalkylalkoxysilane precursor will next be more fully described.

AMINOALKYLALKOXYSILANE PRECURSOR

A great number of aminoalkylalkoxysilane precursors are known and suitable for conversion to the nitrogen containing, partially hydrolyzed condensate of the first component.

Many suitable aminoalkylalkoxysilane precursors may be represented by the structure of FIG. 1, below.

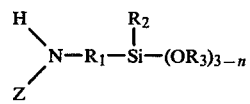

FIG. 1 wherein $R_1$ is a divalent hydrocarbon group having 1 to about 14 carbon atoms, $R_2$ and $R_3$ are selected from a monovalent hydrocarbon radical having 1 to about 4 carbon atoms, Z is a hydrogen or an aminoalkyl group, and n is 0 or 1.

For example, many known and suitable aminoalkylalkoxysilanes useful as precursors for the first component are as follows:

aminoethyl-triethoxysilane, β-amino-ethyltrimethoxysilane, β-aminoethyl-triethoxysilane, β-amino-ethyltributoxysilane, β-aminoethyltripropoxysilane, α-amino-ethyl-trimethoxysilane, α-amionethyl-triethoxysilane, γ-amino-propyltrimethoxysilane, γ-aminopropyl-triethoxysilane, γ-amino-propyl-tributoxysilane, γ-amino-propyltripropoxysilane, β-amino-propyl-trimethoxysilane, β-aminopropyl-triethoxysilane, β-amino-propyltripropoxysilane, β-aminopropyl-tributoxysilane, α-amino-propyl-trimethoxysilane, α-aminopropyltriethoxysilane, α-aminopropyl-tributoxysilane, α-amino-propyl-tripropoxysilane, N-aminomethylaminoethyl-trimethoxysilane, N-aminomethylaminomethyl-tripropoxysilane, N-aminomethyl-β-aminoethyl-trimethoxysilane, N-aminomethyl-β-aminoethyl-triethoxysilane, N-aminoethyl-β-aminoethyl-tripropoxysilane, N-aminomethyl-γ-aminopropyl-trimethoxysilane, N-aminomethyl-γ-aminopropyl-triethoxysilane, N-aminomethyl-γ-aminopropyl-tripropoxysilane, N-aminomethyl-β-aminopropyl-trimethoxysilane, N-aminomethyl-β-aminopropyl-triethoxysilane, N-aminomethyl-β-aminopropyl-tripropoxysilane, N-aminopropyltripropoxysilane, N-aminopropyl-trimethoxysilane, N-(β-aminoethyl)-β-aminoethyl-trimethoxysilane, N-(β-aminoethyl)-β-aminoethyl-triethoxysilane, N-(β-aminoethyl)-β-aminoethyl-tripropoxysilane, N-(β-aminoethyl)-β-aminoethyl-trimethoxysilane, N-(β-aminoethyl)-α-aminoethyl-triethoxysilane, N-(β-aminoethyl)-αaminoethyl-tripropoxysilane, N-(β-aminoethyl)-β-aminopropyl-trimethoxysilane, N-(β-aminoethyl)-γ-aminopropyl-triethoxysilane, N-(β-aminoethyl)-γ-aminopropyl-tripropoxysilane, N-(β-aminoethyl)-γ-aminopropyl-trimethoxysilane, N-(β-aminoethyl)-β-aminopropyl-triethoxysilane, N-(β-aminoethyl)-β-aminopropyl-tripropoxysilane, N-(γ-aminopropyl)-β-aminoethyl-trimethoxysilane, N-(γ-aminopropyl)-β-aminoethyl-triethoxysilane, N-(γ-aminopropyl) β-aminoethyl-tripropoxysilane, N-methyl aminopropyl trimethoxysilane, β-aminopropyl methyl diethoxysilane, γ-diethylene triamine-propyltriethoxysilane.

A particularly preferred aminoalkylalkoxysilane precursor is γ-aminopropyl triethoxy silane due to its wide commercial availability.

SECOND COMPONENT

The second component is an epoxy containing, partially hydrolyzed compound derived by partial hydrolysis from an epoxyalkylalkoxysilane precursor.

Many suitable epoxyalkylalkoxysilane precursors may be represented by the structure of FIG. 2, below.

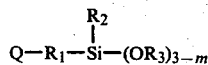

FIG. 2 wherein $R_1$ is a divalent hydrocarbon group having 1 to about 14 carbon atoms, $R_2$ and $R_3$ are selected from a monovalent hydrocarbon radical having 1 to about 4 carbon atoms, Q is a glycidoxy or epoxycyclohexyl group, and m is 0 or 1.

A wide variety of epoxyalkylalkoxysilanes are suitable as precursors for the second component, many of which are as follows:
glycidoxymethyl-trimethoxysilane, glycidoxymethyltriethoxysilane, glycidoxymethyl-tripropoxysilane, glycidoxymethyl-tributoxysilane, β-glycidoxyethyl-trimethoxysilane, β-glycidoxyethyltriethoxysilane, β-glycidoxyethyl-tripropoxysilane, β-glycidoxyethyl-tributoxysilane, β-glycidoxyethyltrimethoxysilane, α-glycidoxyethyl-triethoxysilane, α-glycidoxyethyl-tripropoxysilane, α-glycidoxyethyltributoxysilane, γ-glycidoxypropyl-trimethoxysilane, γ-glycidoxypropyl-triethoxysilane, γ-glycidoxypropyl-tripropoxysilane, γ-glycidoxypropyltributoxysilane, β-glycidoxypropyl-trimethoxysilane, β-glycidoxypropyl-triethoxysilane, β-glycidoxypropyl-tripropoxysilane, β-glycidoxypropyltributoxysilane, α-glycidoxypropyl-trimethoxysilane, α-glycidoxypropyl-triethoxysilane, α-glycidoxypropyl-tripropoxysilane, α-glycidoxypropyltributoxysilane, γ-glycidoxybutyl-trimethoxysilane, δ-glycidoxybutyl-triethoxysilane, δ-glycidoxybutyl-tripropoxysilane, δ-glycidoxybutyl-tributoxysilane, δ-glycidoxybutyl-trimethoxysilane, γ-glycidoxybutyl-triethoxysilane, γ-glycidoxybutyl-tripropoxysilane, γ-propoxybutyl-tributoxysilane, δ-glycidoxybutyl-trimethoxysilane, δ-glycidoxybutyl-triethoxysilane, δ-glycidoxybutyl-tripropoxysilane, α-glycidoxybutyl-trimethoxysilane, α-glycidoxybutyl-triethoxysilane, α-glycidoxybutyl-tripropoxysilane, α-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-trimethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexy) butyl-triethoxysilane, (3,4-epoxycyclohexyl)-butyl-tripropoxysilane, (3,4-epoxycyclohexyl)butyl-tributoxysilane.

A particularly preferred epoxyalkylalkoxysilane is γ-glicidoxy propyl trimethoxy silane due to its wide commercial availability.

PARTIAL HYDROSYLATES

The aminoalkylalkoxysilane precursor and the epoxyalkylalkoxysilane precursor are partially hydrolyzed in forming compositions of the present invention.

Hydrolysis refers to the initial products of reaction of water with alkoxy groups of the aminoalkylalkoxysilane precursor and of the epoxyalkylalkoxy silane precursor. For example, FIG. 3, below, illustrates a complete hydrolysis of the maximum three alkoxy groups.

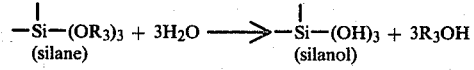

FIG. 3 where $R_3$ is as previously described, such as an alkyl, usually methyl or ethyl.

Silanols are relatively unstable and tend to condense spontaneously. Thus, the simultaneous hydrolysis of a mixture of different silanes is normally referred to as co-hydrolysis, and a hydrosylate refers to the end product of hydrolysis where some condensation has normally occurred during the hydrolysis reaction, so that homopolymers or copolymers are formed.

The first and second components of the inventive coating composition are partially hydrolyzed from the respective precursors by greater than 40% of a stoichiometric amount of water required to hydrolyze a plurality of alkoxy groups. That is, hydrolysis stoichiometry refers to the mole percent of water, per mole of hydrolyzable silane substituent employed, to prepare the hydrosylate.

The precursor compounds include at least two, and usually three, alkoxy groups covalently bonded to a silicon atom. Each precursor may be partially hydrolyzed to form the partial hydrosylate thereof by adding enough water to hydrolyze greater than 40% of the two or three available alkoxy groups, and more preferably having enough water to hydrolyze about 60% to about 80% of these alkoxy groups. This partial hydrolysis is generally illustrated by FIG. 4, below, where a silane moiety with three alkoxy groups is shown having two of the three alkoxy groups being hydrolyzed to form the partial hydrosylate.

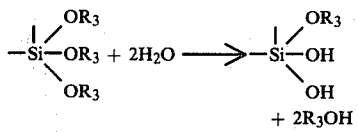

FIG. 4

Partial hydrolysis of the aminoalkylalkoxysilane precursor may be performed by adding enough water to hydrolyze greater than 40% of the available alkoxy groups, and an approximately equal amount of a water soluble alcohol, such as ethanol or methanol, may be added to aid solubility. The mixture is preferably equilibrated, or ripened, for a sufficient period of time to effect the partial hydrolysis. The partial hydrolysis may be performed either by stripping off volatiles, such as the volatile alcohol byproduct of the hydrolysis, or not.

Partial hydrolysis of the epoxyalkylalkoxysilane precursor may be effected by adding enough water to hydrolyze greater than 40% of the available alkoxy group. Normally, an approximately equal amount of water soluble alcohol, such as ethanol or methanol, is added to aid solubility and enough acid, such as hydrochloric or acetic is added to lower the pH to about 4.0–4.5. The mixture is then preferably equilibrated, or ripened, for a sufficient period of time for the partial hydrolysis to occur. Volatiles, such as the volatile alcohol byproduct, may or may not be stripped off.

PARTIALLY HYDROLYZED CONDENSATE

The first component of the inventive coating composition is a partially hydrolyzed condensate derived from the aminoalkylalkoxysilane precursor, preferably via the partial hydrosylate thereof, and includes amines, aminals, enamines, mixtures of these, and polymers thereof. More particularly, the first component includes hydrocarbylidene amino hydrocarbyl alkoxy silanes, hydrocarbenamine hydrocarbyl alkoxysilanes, hydrocarbylidene amino hydrocarbenamine alkoxy silanes, N,N-hydrocarbyl alkyl silane animals, and mixtures thereof.

The first component is preferably derived from the aminoalkylalkoxysilane precursor, or via the partial hydrosylate thereof, and an excess of a carbonyl containing compound. Exemplary carbonyl containing compounds are ketones, aldehydes, or mixtures thereof, and a particularly preferred carbonyl containing compound for forming the condensate is a major portion of methyl ethyl ketone and a minor portion of acetone, cyclohexanone, or a mixture thereof. We have discovered that formation of the first component in accordance with the present invention extends the working life of the inventive coating composition.

The aminoalkylalkoxysilane precursors have one or more primary and/or secondary amino groups. It is believed that the carbonyl carbon of the carbonyl containing compound forms a bond with the nitrogen of the precursor's amino group. In the presence of sufficient of the carbonyl containing compound, this reaction goes to completion without the necessity of removing water, since the water of condensation reacts with alkoxy groups of the aminoalkylalkoxysilane precursor, and substantially all of the aminoalkylalkoxysilane precursor is this in the imine, aminal and/or enamine form. Thus, for example, a mixture containing one mole of —NH$_2$ and one mole of >C=O (i.e. one mole of aminopropyl-triethoxysilane and one mole of dimethyl ketone) was monitored by observation of the IR spectra. The initial carbonyl band at 1700–1750μ rapidly and totally disappears and a new band at about 1650–1700μ appears. This latter band is characteristic of the "imine stretch band" (—CH=N—).

The first component is normally selected from a hydrocarbylidene amino hydrocarbyl alkoxy silane (generally illustrated by FIG. 5, below), a hydrocarbenamine hydrocarbyl alkoxy silane (generally illustrated by FIG. 6, below), a hydrocarbylidene amino hydrocarbenamine alkoxy silane (generally illustrated by FIG. 7, below), and an N,N-hydrocarbyl alkyl silane aminal (generally illustrated by FIG. 8, below).

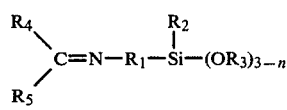

FIG. 5

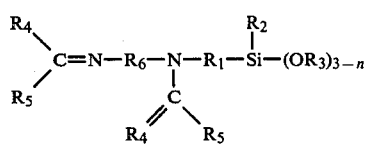

FIG. 6

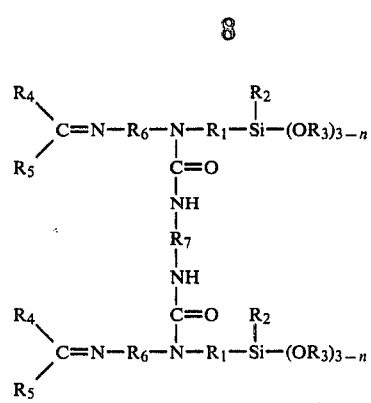

FIG. 7

FIG. 8

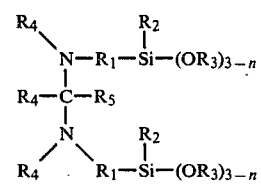

(where R$_1$, R$_2$, R$_3$, and n are as have already been described and R$_4$, R$_5$, R$_6$ and R$_7$ are normally hydrocarbon groups containing about 2 to about 14 carbon atoms).

It should be understood, however, that alkoxy groups of the FIGS. 5–8 structures will normally be partially hydrolyzed, as has previously been described, and that these nitrogen containing, partially hydrolyzed condensates include homopolymers which will normally form by condensation of some of the hydrolyzed alkoxy groups during partial hydrolysis of the precursor, or during reaction with the carbonyl containing compound.

A particularly preferred first component is a ketimine derived from the partial hydrosylate of γ-aminopropyl-triethoxysilane.

Examples 1–3, below, illustrate preparation of the first component, and examples 4 and 5 illustrate preparation of the second component.

EXAMPLE 1

1000 g (4.52 mole) γ-aminopropyl-triethoxysilane was charged to a flask having an agitator thermometer and condenser. 191 g methanol was added, mixed, and then 191 g (10.61 mole) distilled water added for the partial hydrolysis. The mixture was heated to reflux, and held three hours. A trap was fitted to the flask and volatiles were stripped off at a flask temperature of 90°–95° C. Yield of the partial hydrosylate was 650–655 g.

182 g of isopropyl alcohol was added to give a 65% non-volatile batch then reduced to 35% non-volatile with 716 g (9.94 mole) methyl ethyl ketone, and allowed to stand 1–2 hours to form the ketimine. (Amine hydrogen equivalent weight, or determined total of nitrogen active hydrogens upon decomposition of ketimine, calculated to be 170.9 on solution.)

EXAMPLE 2

Into a 500 ml vessel were weighed 100 g (0.452 mole) γ-aminopropyl-triethoxysilane and 18.8 g (1.04 mole) distilled water. The container was closed, and the mixture was allowed to stand 16 hours at 20°–25° C. to form the partial hydrosylate. Theoretical amine hydrogen equivalent weight was 110.6 on solution. 162.7 g (2.26 mole) methyl ethyl ketone was added to form the ketimine, with excess methyl ethyl ketone as solvent.

EXAMPLE 3

In a first vessel, 221.0 g (1.0 mole) of γ-aminopropyltriethoxysilane was admixed with 41.5 g (2.3 mole) water and allowed to stand for about 12 hours at 20°-25° C. to form the partial hydrosylates thereof. The ketimine was then formed by adding 205.5 g (2.85 mole) methyl ethyl ketone (a molar excess of 1.85). The non-volatile content was 35%.

EXAMPLE 4

1000 g (4.24 mole) of γ-glycidoxypropyltrimethoxysilane was charged to a flask having a thermometer, condenser and stirrer. 2.32 g of methanol was added. This was thoroughly mixed, and 232 g (12.9 mole) distilled water and 2.0 g 0.1 N HCl were added. The mixture was heated to reflux, and held 3 hours. A trap was fitted to the flask and volatiles were stripped off at a flask temperature of 105° C.-110° C. A vacuum of about 5 torr was pulled, and the volatiles were stripped at about 115°-120° C. to give a yield of the partial hydrosylate of 788 g. 350 g methyl ethyl ketone was added to give 65% non-volatile. Batch was then reduced to 35% non-volatile with 975 g (13.54 mole) methyl ethyl ketone. Epoxide equivalent weight on solution calculated to be 498.3.

EXAMPLE 5

Into a 200 ml sealable glass container were weighed 100 g (0.424 mole) γ-glycidoxypropyltrimethoxysilane and 16.9 g denatured alcohol and mixed well. 22.88 (1.27 mole) distilled water and 0.2 g of 0.1 N hydrochloric acid were added and well mixed. The container was sealed and allowed to stand 16 hours at room temperature to form the partial hydrosylates. Theoretical epoxide equivalent weight was 329.5 on solution.

MIXTURE OF COMPONENTS

The first component and second component are admixed in the presence of sufficient organic solvent so as to form a dissolved mixture in accordance with compositions of the present invention. Such admixture may be with various ratios of epoxy to amino hydrogen, or nitrogen active hydrogen, formed upon regeneration of the amine. In the admixture, the first component decomposes to a partially hydrolyzed, aminoalkylalkoxysilane having amino groups which may be primary or secondary. In effect, the nitrogen containing, partially hydrolyzed condensate derived from the aminoalkylalkoxysilane precursor and the carbonyl containing compound, decomposes by absorption of moisture from the atmosphere, or by the application of heat. Thus, the amino groups are freed, or regenerated, for reaction with epoxy groups of the second component. This decomposition is sufficiently complete to permit the amino-epoxy reaction, but is sufficiently slow to delay the reaction and hence extend the working life of the coating compositions. The total of nitrogen active hydrogens of the partially hydrolyzed, aminoalkylalkoxysilane resulting therefrom may be predetermined before the admixing.

A preferred ratio of the determined nitrogen active hydrogen of the decomposed first component is about 0.5 to about 3 per epoxy group of the second component. (e.g., about 0.3 to about 2 epoxy groups for each amino hydrogen, and more preferably from about 0.6 to about 1.8 epoxy groups for each amino hydrogen.)

Solutions of the first and second components may be simply combined and admixed, and the reaction product will form therein. The reaction product takes the form of a network polymer.

Where the first and second components have been partially hydrolyzed at the low end (e.g. about 40%), then it is preferred that the reaction mixture either be permitted to age for about 4-6 hours at room temperature prior to coating, or aged for several hours at an elevated temperature. Within the more preferred amount of hydrolysis range (e.g. about 60%-80%) little or no aging time is necessary. Example 6, below, illustrates formation of 11 coating compositions using various amino hydrogen to epoxy group ratios.

EXAMPLE 6

236.0 g (1 mole) of γ-glicidoxypropyltrimethoxysilane was admixed with 0.48 g (0.1 N) HCl, 40.0 g ethanol and 52.8 g (2.93 mole) water. This was mixed and allowed to stand 12 hours at about 20°-25° C. to form the second component via the partial hydrosylates thereof.

The non-volatile content of the second component solution was adjusted to 35% by adding 170.7 g of methyl ethyl ketone.

11 coating compositions were then prepared by mixing aliquots of the first component solution (prepared as in Example 3) and the second component solution (prepared as described above) in different ratios of epoxy to calculated amino hydrogen ratios. The reaction product quickly formed therein. These 11 coating compositions were in an epoxy:amino hydrogen ratio as follows:

| Coating Composition # | Epoxy:Amino Hydrogen |
| --- | --- |
| 1 | 10:1 |
| 2 | 4:1 |
| 3 | 1.8:1 |
| 4 | 1.5:1 |
| 5 | 1.25:1 |
| 6 | 1:1 |
| 7 | 0.82:1 |
| 8 | 0.67:1 |
| 9 | 0.58:1 |
| 10 | 0.25:1 |
| 11 | 0.01:1 |

Each of these 11 coating compositions was coated onto a degreased, flat panel formed of a polyallyl diglycol carbonate (manufactured by PPG Industries, Inc. under the trademark CR-39). The coatings were formed by drawing down with a #22 wire wound coating rod, and then cured by baking for 5 hours at 100° C. The film thicknesses of the cured coating compositions were from about 0.0003 to about 0.0004 mil (about $7.6 \times 10^{-5}$ to about $10.2 \times 10^{-5}$ m). Adhesion of the 11 cured coating compositions, as tested by the American Society for Testing and Materials procedure D3359, was 100%.

The abrasion resistance of the coatings was determined by rubbing each of the 11 cured coatings with 000 steel wool at a predetermined pressure. Each "rub" represents a forward and then backward direction. The scratch resistance was measured using a Gardner Labs Scratch Abrasion Tester. The results were as follows:

| Cured Coating # | Results | |
|---|---|---|
| | Abrasion Resistance | Scratch Resistance |
| 1 | Worn through to substrate after 5-10 rubs at 40 psi | Fail 48g |
| 2 | Worn through to substrate after 5-10 rubs at 40 psi | Pass 48g Fail 96g |
| 3 | 1-2 scratches after 100 rubs at 40 psi (276 kPa), no scratches after 100 rubs at 30 psi | Pass 148g Fail 196g |
| 4 | 1-2 scratches after 100 rubs at 40 psi (276 kPa), no scratches after 100 rubs at 30 psi | Pass 148g Fail 196g |
| 5 | 1-2 scratches after 100 rubs at 40 psi (276 kPa), no scratches after 100 rubs at 30 psi | Pass 148g Fail 196g |
| 6 | 1-2 scratches after 100 rubs at 40 psi (276 kPa), no scratches after 100 rubs at 30 psi | Pass 148g Fail 196g |
| 7 | 1-2 scratches after 100 rubs at 40 psi (276 kPa), no scratches after 100 rubs at 30 psi | Pass 148g Fail 196g |
| 8 | 1-2 scratches after 100 rubs at 40 psi (276 kPa), no scratches after 100 rubs at 30 psi | Pass 148g Fail 196g |
| 9 | 1-2 scratches after 100 rubs at 40 psi (276 kPa), no scratches after 100 rubs at 30 psi | Pass 148g Fail 196g |
| 10 | Many scratches after 100 rubs at 40 psi (276 kPa), a few scratches at 30 psi | Pass 48g Fail 96g |
| 11 | Worn through to substrate after 5-10 rubs at 40 psi | Fail 48g |

As the above results illustrate, cured coatings of compositions 1, 2 and 11 resulted in poor abrasion resistance, cured coarings of composition 10 resulted in better abrasion resistance, and cured coatings of compositions 3-9 provided excellent abrasion resistance. Coating compositions 3-9 are preferred embodiments of the present invention.

The inventive coating compositions are preferably formed by separately conducting the partial hydrolysis of the two necessary precursors before combining the first and second components. It should also be understood that additional hydrolysis of alkoxy groups will normally occur during formation of the imine, aminal, and enamine forms of the first component. However, the coating compositions may be obtained by combining the epoxyalkylalkoxysilane precursor, or its partial hydrosylate, and the first component (but before partial hydrolysis caused by external addition of water) in the presence of an organic solvent, and adding sufficient water to hydrolyze greater than 40% of all the alkoxy groups.

Nevertheless, whether a coating composition in accordance with the present invention is prepared by separate hydrolyses or by jointly hydrolyzing the starting components, the abrasion resistance resulting from cured coatings thereof is critically dependent upon the amount of hydrolysis. Partial hydrolysis levels of about 35% or lower result in unacceptable abrasion resistance. At about 40% the abrasion resistance improves, but is at best only marginally acceptable. At levels greater than 40%, and more preferably 60%-80%, excellent abrasion resistance results. This is illustrated by the 5 coating compositions described in Example 7, below.

EXAMPLE 7

Into a 200 ml glass container were weighed 22.1 g (0.1 mole) γ-aminopropyl-triethoxysilane and 100.0 g ethanol. To this was added 47.2 g (0.2 mole) γ-glicidoxypropyl-trimethoxysilane. 5 separate samples (16.9 g each) were taken of this admixture, and a predetermined amount of distilled water added to each. All 5 were allowed to react over a period of 30-60 minutes, and then each was coated onto a respective degreased polyallyl diglycol carbonate panel using a #22 wire wound coating rod. The coatings were done as close to the gel point of each coating composition as practical, to ensure that the maximum partial hydrolysis had occurred. Each of the 5 coatings was then cured for 2 hours at 120° C. (Another identical 5 were prepared, but were cured for 18 hours at 85° C.; however, the results of adhesion and abrasive tests were equivalent to the results presented below.) Film thicknesses of the 5 cured coatings were from about 0.0003 to about 0.0005 mil (about $7.6 \times 10^{-5}$ to about $12.7 \times 10^{-5}$ m). The abrasion resistant results of the 5 different coating compositions (listed as compositions 12-16) and the scratch resistance, measured with a Gardner Labs Scratch and Adhesion Tester, were as follows:

| Coating Composition # | Water Sufficient to Hydrolyze Following % of Alkoxy Groups | Abrasion Resistance Results After Curing | Scratch Resistance |
|---|---|---|---|
| 12 | 83% | 1 or 2 scratches after 100 rubs at 40 psi, no scratches after 100 rubs at 30 psi | Pass 148g Fail 196g |
| 13 | 67% | 1 or 2 scratches after 100 rubs at 40 psi, no scratches after 100 rubs at 30 psi | Pass 148g Fail 196g |
| 14 | 50% | 1 or 2 scratches after 100 rubs at 40 psi, no scratches after 100 rubs at 30 psi | Pass 148g Fail 196g |
| 15 | 40% | 3 to 5 scratches after 100 rubs at 40 psi, 1 or 2 scratches after 100 rubs at 30 psi | Pass 100g Fail 148g |
| 16 | 35% | Severe scratching after 10 rubs and worn through to substrate after 20 rubs at 40 psi, many scratches after 100 rubs at 30 psi | Pass 48g Fail 96g |

As may be seen from the above abrasion resistance results, coating compositions 12-14 resulted in coatings with excellent abrasion resistance. Compositions 12-14 are in accordance with the present invention by having greater than 40% of the alkoxy groups being hydrolyzed. Comparative composition 15, with only 40% hydrolysis, resulted in only marginal abrasion resistance. Comparative composition 16, with a much lower amount of hydrolysis than in accordance with the present invention, resulted in unacceptable abrasion resistance. The poor abrasion resistance, as illustrated by composition 16 of Example 7 with relatively low hydrolysis levels, was found to be consistent with results from comparison tests of six prior art coating compositions. These comparison tests were as described in Example 8, below.

COMPARATIVE EXAMPLE 8

Six coating compositions for comparison testing were prepared in accordance with the compositions as described by Examples 1, 2, 4, 5, 11 and 12 of U.S. Pat. No. 3,961,977. Each of these six compositions was flow coated onto two degreased polycarbonate flat panels, and then one of each cured for two hours at 120° C., and the other of each cured for 18 hours at 85° C. The resultant film thicknesses were 0.0003–0.0005 mil (about $7.6 \times 10^{-5}$ to about $12.6 \times 10^{-5}$ m). All twelve panels were then rubbed with 000 steel wool at 40 psi. Severe scratching occurred with 10 rubs on all. At 20 rubs, the coatings were worn throught to the substrates. All passed 48 g and failed 96 g in the scratch test using the Gardner Labs Scratch and Adhesion Tester.

OPTIONAL COMPONENTS

The reaction product of the first and second component takes the form of a network polymer. Other monomers, or polymers, which will react with either the amino group of the first component (before formation of the imine, aminal, or enamine, or after decomposition thereof), the epoxy group of the second component, or some of the silanol functionalities of either component, may also be included in the inventive coating compositions in order to improve properties such as flexibility and humidity resistance, or to reduce costs without adversely affecting film performance. Such other monomers or polymers will thus react to form polymer units in the network polymer.

However, these other, optional monomers or polymers should not exceed an amount which would remove greater than about 49% of the amino or epoxy groups otherwise available for forming the reaction product. That is, not greater than about 49 wt. % of the network polymer has polymer units derived from one or more of the optional monomers or polymers. (Where the optional monomers or polymers are not utilized, the network polymer normally is about 100 wt. % of reaction product.)

Examples of the optional monomers or polymers which may be included in the inventive coating compositions are various polyepoxy (non-hydrolyzable silane) compounds, polyamines (non-hydrolyzable silane), compounds having acrylic or methacrylic unsaturations, hydroxyl containing compounds, silane compounds containing groups capable of reacting with epoxy groups, amine groups, or silanols. For example, among the polyepoxy compounds suitable as optional monomers are neopentylclygcol diglycidyl ether, trimethylolpropane triglycidyl ether, cyclohexanedimethanol diglycidylether, hydrogenated Bisphenol A diglycidylether, Bisphenol A diglycidylether, isophthalic acid diglycidylester, hexahydrophthalic acid diglycidylester, glycerol di and triglycidylether, Bis(3-glycidoxypropyl)tetramethyldisiloxane, polyglycidyl hydantoins, $N_1N$-diglycidyl aniline, $N,N,N^1,N^1$-tetraglycidyl methylene dianiline, $N,N,N^1,N^1$-tetraglycidyl-m-Xylyene diamine. Suitable polyamines include, for example, 2,3-propane diamine, iso-phorone diamine, and m-xylylene diamine. Suitable compounds having acrylic or methacrylic unsaturations include, for example, glycidyl acrylate, glycidyl methacrylate, trimethylolpropane triacrylate, hexanediol diacrylate, and vinyl pyrolidone. Suitable silane comonomers include: Aminopropyl Dimethyl Ethoxy Silane, Aminopropyl Methyl Diethoxy Silane, Isocyanatopropyl Triethoxy Silane, Allyltriethoxysialne, Aminobutyldimethylmethoxysilane, N-2-Aminoethyl-3-Aminopropyltrimethoxysilane, 3-Aminopropyldiethylmethylsilane, Aminopropyldimethylethoxysilane, n-Amyltriethoxysilane, Benzyltriethoxysilane, Bis(3-Glycidoxypropyl)Tetramethyldisiloxane, Bis(2-Hydroxyethyl)Aminopropyltriethoxysilane, Bis(3-(Triethoxysilyl)Propyl)Amine, Bis(3-Triethoxysilyl)Propyl)Ethylene Diamine, 1,2,-Bis(-Trimethoxysilyl)Ethane, Butyltrimethoxysilane, 3-Chloropropyltrimethoxysilane, 2-Cyanoethylmethyldiethoxysilane, 2-Cyanoethyltriethoxysilane, (N,N-Diethyl-3-Amino)Propyltrimethoxysilane, N,N-Dimethylaminophenyltriethoxysilane, Dimethyldiacetoxysilane, and Diphenylsilanediol.

Examples 9–13, below, illustrate coating compositions in accordance with the present invention which have been prepared to include various of the optional monomers. In each of examples 9–13 the term "epoxy solution" refers to a sample taken from the previously described Example 4 solution (which is adjusted to a nonvolatile, solids content of 35% by addition of methyl ethyl ketone). Similarly, the term, "ketimine solution" in the following examples 9–13 refers to a sample having been taken from the previously described Example 1 solution (which is adjusted to a non-volatile solids content of 35% by addition of methyl ethyl ketone).

EXAMPLE 9

A coating composition was formed from 50 g epoxy solution, 21.4 g ketimine solution, 3.75 g glycerol triepoxide, and 6.25 g methyl ethyl ketone. The nonvolatile content of the coating composition was 35 wt. %. A sample of this coating composition was drawn down on a flat piece of polyallyl diglycol carbonate with a #22 wire wound rod and baked for 15 hours at 80° C. The dried film thickness was 0.0003–0.0004 mil. Adhesion measured by ASTM D3359 was 100%. Scratch resistance measured by the Gardner Scratch and Adhesion Tester was 150 g. The coating exhibited 1 or 2 scratches when rubbed 100 times at 40 psi, and no scratches after 100 rubs at 30 psi. Pot life of the coating composition was 24–30 hours.

EXAMPLE 10

Another coating composition was formed by admixing 50 g epoxy solution, 214 g ketimine solution, 3.4 g of 1,4 butanediol diglycidylether, and 7.6 g methyl ethyl ketone. A sample of this coating composition was coated, cured and tested as in Example 9 with equivalent results.

EXAMPLE 11

Another coating composition was formed by admixing 50 g epoxy solution, 21.4 g ketimine solution, 3.4 g neo-pentyl glycol diglycidylether and 6.6 g methyl ethyl ketone. A sample of this coating composition was coated, cured and tested as in Example 9 with equivalent results.

EXAMPLE 12

Another coating composition was formed by admixing 50 g epoxy solution, 25.7 g ketimine solution, 3.2 g glycidyl acrylate and 5.9 g methyl ethyl ketone. A sample of this coating composition was coated, cured and tested as in Example 9 with equivalent results.

EXAMPLE 13

Another coating composition was formed by admixing 50 g epoxy solution, 25.6 g ketimine solution, 4.9 g trimethylol propane triacrylate and 5.9 g methyl ethyl ketone. A sample of this coating composition was coated, cured and tested as in Example 9. The results were equivalent to Example 9 but the pot life was about 8-10 hours at room temperature.

Working life extension of the inventive compositions is illustrated by comparison between a composition in accordance with the present invention (Example 14, below) with four comparative compositions (Examples 15-18, below) which were coated as close to the gel point as possible.

EXAMPLE 14

Into a sealable, glass container were charged 50 g of γ-aminopropyl-triethoxysilane (0.226 mole) and 50 g (0.694 mole) methyl ethyl ketone. The mixture was allowed to stand one hour to permit the ketimine to form. Then 106.8 g (0.4525 mole) of γ-glicidoxypropyl-trimethoxysilane, 117.2 g of methyl ethyl ketone (1.63 mole) and 12.4 g (0.678 mole) distilled water were added to the ketimine mixture (representing a molar ratio of water per siloxane group of 0.68). The nonvolatile solids content was 45 wt. % of the total coating composition, which was composed of the first component, or ketimine, and the second component (formed via partial hydrolysis of the γ-glycidoxypropyl-trimethoxysilane). The coating composition was allowed to age for about one hour, and then a sample was drawn down onto a degreased panel of polyallyl diglycol carbonate with a #22 wire wound coating rod. The coating was cured by baking at 15 hours at 80° C. The adhesion, as tested by ASTM D3359, was 100%. The scratch resistance on a Gardner Labs Scratch and Adhesion Tester was 148 g. The surface, when rubbed 100 times at 40 psi with 000 steel wool exhibited 1 or 2 scratches, but no scratches after 100 rubs at 30 psi. The usable pot life was 16-18 hours.

COMPARATIVE EXAMPLE 15

The composition as in Example 14 was prepared, but instead of methyl ethyl ketone, an equivalent molar quantity of denatured alcohol was utilized. No ketimine formation occurred, and the partially hydrolyzed silane precursor was present as the original primary amine. The coating composition was coated and cured as in Example 14. However, the pot life of the composition was only 45-60 minutes.

COMPARATIVE EXAMPLE 16

The composition as in Example 14 was prepared, but instead of methyl ethyl ketone an equivalent molar quantity of methanol was utilized. No ketimine formation occurred, and the partially hydrolyzed silane was present as the original primary amine. The coating composition was coated and cured as in Example 14. However, the pot life of the composition was only 45-60 minutes.

COMPARATIVE EXAMPLE 17

The composition as in Example 14 was prepared, but instead of methyl ethyl ketone an equivalent molar quantity of isopropanol was utilized. No ketimine formation occurred, and the partially hydrolyzed silane was present as the original primary amine. The coating composition was coated and cured as in Example 14. However, the pot life of the composition was only 45-60 minutes.

COMPARATIVE EXAMPLE 18

The composition as in Example 14 was prepared, but instead of methyl ethyl ketone an equivalent molar quantity of t-butanol was utilized. No ketimine formation occurred, and the partially hydrolyzed silane was present as the original primary amine. The coating composition was coated and cured as in Example 14. However, the pot life of the composition was only 45-60 minutes.

As may be seen by comparing the pot, or working, life of Example 14 with the pot, or working, lives of Comparative Examples 15-18, use of the first component in the ketimine form resulted in a working life extension by a factor of about 16.

As previously mentioned, it is preferred that the carbonyl containing compound be utilized in a molar excess to form the first component. More preferably, such an excess is a molar ratio of about 3:1 with respect to the aminoalkylalkoxysilane precursor, or partial hydrosylate thereof.

In addition to optional monomers, the inventive compositions may include various other additives, such as flow control additives, cellulosic esters (particularly cellulose acetate butyrate), catalysts, UV absorbers, antioxidants, and so forth. Example 19, below, illustrates a particularly preferred inventive coating composition usefully flow coated onto plastic lenses.

EXAMPLE 19

50 g of epoxy solution (prepared as in Example 5), 33.4 g ketimine solution (prepared as in Example 1), 7.1 g cyclohexane dimethanol diepoxide, 13.2 g MEK, and 0.075 g of a flow control agent (FC430, fluorinated surfactant, from 3M Co.) were admixed.

The sample was flow coated onto semifinished lens blank, 6 base, polyallyldiglycol carbonate, and baked 15 hrs. at 80° C. Film thickness 0.0003-0.0004 mil. Lenses were evaluated with results as follows.

| | |
|---|---|
| Adhesion ASTM D3359 | 100% |
| Abrasion Resistance: | |
| 40 psi | 1-2 scratches |
| 30 psi | 0 |
| Scratch resistance (Using Gardner Labs Scratch and Adhesion Tester) | Pass 148g, Fail 196g |
| Appearance | Glossy, clear, water white, no pinholes or flow defects |
| Exposed to Boiling H$_2$O | Crazed in 15 mins. |
| Atlas Twin-Arc Weatherometer | No crazing, 1,000 hrs. No yellowing |
| Humidity Resistance: Temp. 140° F., 98% Humidity | No change, 72 hrs. |
| Temp. 120° F. | No change, 168 hrs. |
| Abrasion Resistance after Humidity* | 1-2 scratches, 40 psi 0 scratches, 30 psi |
| Adhesion ASTM D3359 after humidity* | 100% |
| Thermal Shock: | |
| Freezer ½ hr. | No sign of crazing |
| Oven 15 mins. 212° F. | No adhesion loss per ASTM D3359 50 cycles |

*(Allowed to equilibrate 24 hrs. ambient conditions prior to testing)

In sum, coating compositions in accordance with the invention provide curable, mar resistant coatings on plastic substrates, particularly on plastic lenses for prescription glasses. Although curing will normally be by application of heat (e.g. thermoset), the coatings may be cured, albeit for longer periods of time, at ambient temperatures.

Plastic substrates on which the inventive coatings may be applied include polyallyl diglycol carbonate, polycarbonate, styrene, PVC, cellulose acetate and acrylic/styrene copolymer. Although particularly well suited for providing cured, mar resistant coatings on plastic substrates, the inventive coating compositions are also useful for a wide variety of other substrate materials, for example glass, aluminum, steel, copper, brass, silver, and the like. Cured coatings will normally be transparent, but may be pigmented if desired. Example 20, below, illustrates a coating composition in accordance with the present invention which results in a pigmented coating.

EXAMPLE 20

In a vessel 33.4 g ketimine solution (prepared as in Example 5) was admixed with 29.0 g titanium dioxide rutile grade. Mix was milled using a triple roll mill to a Hegmann Gauge reading of 7-8. To this was then added slowly with agitation 7.1 g cyclohexane dimethanol diepoxide, 50.0 g epoxy solution (prepared as in Example 5), 67.1 g methyl ethyl ketone, and 0.075 g FC430 (fluorinated surfactant supplied by Minnesota Mining & Manufacturing Co.). Sample was drawn down on a lightly abraded, degreased aluminum panel using a #22 coating rod. Panel was baked 3-4 hrs. at 100° C. and allowed to cool.

The film had excellent hiding, was hard, had good flow, high gloss, excellent adhesion, good abrasion resistance and excellent resistance to methyl ethyl ketone, acetone, ethyl alcohol.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:
1. A coating composition, useful for forming mar resistant coatings, comprising:
   an organic solvent; and,
   a mixture of at least two components, said mixture being dissolved in said organic solvent, a first component of said at least two components being derived from an aminoalkylalkoxysilane precursor as a partially hydrolyzed, nitrogen containing imine, aminal, enamine, or mixture thereof, a second component of said at least two components being an epoxy containing, partially hydrolyzed compound derived by partial hydrolysis from an epoxyalkylalkoxysilane precursor, said aminoalkylalkoxysilane precursor and said epoxyalkylalkoxysilane precursor both having a plurality of alkoxy groups, said first and second components being partially hydrolyzed by greater than 40% of a stoichiometric amount of water required to hydrolyze said plurality of alkoxy groups.

2. The coating composition as in claim 1 wherein: said first component is a condensate being selected from the group consisting of hydrocarbylidene amino hydrocarbyl alkoxy silane, hydrocarbenamine hydrocarbyl alkoxy silane, hydrocarbylidene amino hydrocarbenamine alkoxy silane, N,N-hydrocarbyl alkyl silane aminal, and mixtures thereof.

3. The coating composition as in claim 1 wherein: said first component is decomposable, and has a determined total of nitrogen active hydrogens upon decomposition, and said first and second components are admixed with a ratio of said determined total of nitrogen active hydrogens per epoxy group of said second component of about 0.5 to about 3.

4. The coating composition as in claim 1 wherein said first component decomposes to a partially hydrolyzed, aminoalkylalkoxysilane having primary or secondary amino groups, the decomposition being sufficiently complete to permit a reaction between epoxy groups of said second component and amino groups of the decomposed first component, but being sufficiently slow to delay the reaction.

5. The composition as in claim 1 wherein: said first and second components are partially hydrolyzed by from about 60% to about 80% of the stoichiometric amount of water required to hydrolyze said plurality of alkoxy groups.

6. The coating composition as in claim 5 wherein: said mixture is about 20 to about 50 wt. % of said coating composition.

7. The composition as in claim 4 wherein said first component is derived from said aminoalkylalkoxysilane precursor, or a partial hydrosylate thereof, and at least a stoichiometric amont, with respect to said aminoalkylalkoxysilane precursor, of a carbonyl containing compound.

8. The coating composition as in claim 7 wherein: said carbonyl containing compound is a ketone, an aldehyde, or mixtures thereof.

9. The coating composition as in claim 4 wherein: said mixture includes a third component, said third component reactable with said amino groups of the decomposed first component or the epoxy groups of the second component.

10. A coating composition, useful for providing thermoset, mar resistant coatings and having an extended working life, formed by the steps comprising:
   (a) partially hydrolyzing alkoxy groups of an aminoalkylalkoxysilane;
   (b) forming a partially hydrolyzed condensate between the partially hydrolyzed aminoalkylalkoxysilane of step (a) and an excess of a carbonyl containing compound;
   (c) partially hydrolyzing alkoxy groups of an epoxyalkylalkoxysilane; and,
   (d) admixing the partially hydrolyzed condensate of step (a) with the partially hydrolyzed epoxyalkylalkoxysilane of step (c), the partially hydrolyzed condensate and the partially hydrolyzed epoxyalkylalkoxysilane being partially hydrolyzed by from about 60% to about 80% of a stoichiometric amount of water required for complete hydrolysis.

11. The coating composition as in claim 10 further comprising:
   adding a monomeric or polymeric component to the partially hydrolyzed condensate, the monomeric or polymeric component being present in the admixture of step (d).

12. The coating composition as in claim 10 further comprising:
adjusting the admixture of step (d) with sufficient organic solvent to provide from about 20 wt. % to about 50 wt. % of the admixture in said coating composition.

13. The coating composition as in claim 12 wherein: the adjusting provides from about 20 wt. % to about 35 wt. % of the admixture in said coating composition.

14. A method for increasing the working life of silane based coating compositions comprising
(a) partially hydrolyzing alkoxy groups of an aminoalkylalkoxysilane;
(b) forming a partially hydrolyzed imine condensate from the partially hydrolyzed aminoalkylalkoxysilane of step (a) and an excess of a carbonyl compound;
(c) partially hydrolyzing alkoxy groups of an epoxy alkylalkoxysilane;
(d) admixing the partially hydrolyzed imine condensate of step (b) with the partially hydrolyzed epoxyalkylalkoxysilane of step (c);
(e) then regenerating partially hydrolyzed aminoalkylalkoxysilane from the partially hydrolyzed imine condensate to thereby react the regenerated partially hydrolyzed aminoalkylalkoxy silane with the epoxy alkylalkoxysilane.

15. The method of claim 14 wherein all of said reactions are carried out in a non-aqueous solvent.

16. The method of claim 14 wherein the partially hydrolyzed aminoalkylalkoxysilane is regenerated from the partially hydrolyzed imino condensate by the application of heat to the composition mixture.

17. The method of claim 14 wherein the partially hydrolyzed aminoalkylalkoxysilane is regenerated by the addition of moisture to the composition mixture at step (e).

18. The method of claim 14 wherein the aminoalkylalkoxysilane is hydrolyzed to greater than 40 percent of the total hydrolyzable alkoxy groups present on said silane.

19. The method of claim 18 wherein the aminoalkylalkoxysilane is hydrolyzed to from about 60 percent to about 80 percent of the total hydrolyzable alkoxy groups.

20. The method of claim 14 wherein the epoxyalkylalkoxysilane is hydrolyzed to greater than 40 percent of the total hydrolyzable alkoxy groups present on said silane.

21. The method of claim 20 wherein the epoxyalkylalkoxysilane is hydrolyzed to from about 60 percent to about 80 percent.

22. A method for producing highly mar and scratch resistant coatings based on the condensation products of aminoalkylalkoxysilanes and epoxyalkylalkoxysilanes comprising
(a) dissolving aminoalkylalkoxysilane in an organic solvent;
(b) adding sufficient water to hydrolyze greater than 40 percent of the alkoxy groups of said aminoalkylalkoxysilane;
(c) reacting the hydrolyzed aminoalkylalkoxysilane with a carbonyl compound to form hydrolyzed iminoalkylalkoxysilane;
(d) dissolving epoxyalkylalkoxysilane in an organic solvent;
(e) adding sufficient water to hydrolyze greater than 40 percent of the alkoxy groups of said epoxyalkylalkoxysilane;
(f) combining said hydrolyzed iminoalkylalkoxysilane solution with said hydrolyzed epoxyalkylalkoxysilane solutions;
(g) regenerating aminoalkylalkoxysilane from said iminoalkylalkoxysilane by adding further moisture to the combined solutions;
(h) reacting said regenerated aminoalkylalkoxysilane with the epoxyalkylalkoxysilane; and then
(i) coating the reacted aminoalkylalkoxysilane and epoxyalkylalkoxysilane onto a substrate; and
(j) evaporating the organic solvent to yield an adherant mar and scratch resistant coating on said substrate.

* * * * *